(12) United States Patent
Zhong et al.

(10) Patent No.: US 11,307,323 B2
(45) Date of Patent: Apr. 19, 2022

(54) METHODS AND SYSTEMS TO ANALYZE BED BOUNDARY DETECTION

(71) Applicant: Schlumberger Technology Corporation, Sugar Land, TX (US)

(72) Inventors: Helen Xiaoyan Zhong, Sugar Land, TX (US); Steve F. Crary, Al-Khobar (SA); Ettore Mirto, Sugar Land, TX (US); Christophe Dupuis, Tananger (NO); Weixin Dong, Sugar Land, TX (US); Mark T. Frey, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 810 days.

(21) Appl. No.: 15/764,614

(22) PCT Filed: Sep. 26, 2016

(86) PCT No.: PCT/US2016/053653
§ 371 (c)(1),
(2) Date: Mar. 29, 2018

(87) PCT Pub. No.: WO2017/058692
PCT Pub. Date: Apr. 6, 2017

(65) Prior Publication Data
US 2018/0292563 A1 Oct. 11, 2018

Related U.S. Application Data

(60) Provisional application No. 62/235,119, filed on Sep. 30, 2015.

(51) Int. Cl.
*G01V 3/38* (2006.01)
*G01V 3/26* (2006.01)
(Continued)

(52) U.S. Cl.
CPC ............ *G01V 3/38* (2013.01); *E21B 47/09* (2013.01); *E21B 49/00* (2013.01); *G01V 3/26* (2013.01); *G01V 3/30* (2013.01)

(58) Field of Classification Search
CPC .. G01V 99/005; G01V 2210/665; G01V 3/28; G01V 3/38; G01V 3/30; G01V 3/26; E21B 49/00; E21B 47/09
See application file for complete search history.

(56) References Cited

U.S. PATENT DOCUMENTS 5,200,705 A * 4/1993 Clark ................. G01V 3/20
324/338
5,210,691 A * 5/1993 Freedman ............. G01V 3/28
324/339

(Continued)

FOREIGN PATENT DOCUMENTS

WO WO2015134455 A1 9/2015

OTHER PUBLICATIONS

International Search Report and Written Opinion issued in International Patent application PCT/US2016/053653, dated Jan. 10, 2017. 14 pages.

(Continued)

*Primary Examiner* — Akash Saxena

(57) ABSTRACT

Methods capable of determining a depth of investigation of a logging tool can include generating an error distribution model for a logging tool. The methods can also include defining a detection threshold above which a measured signal from a measurement channel of the logging tool can be considered reliable based on output from the error distribution model, and generating a simulated formation model to determine the depth of investigation. The depth of investigation can be biased by the detection threshold.

13 Claims, 14 Drawing Sheets
(3 of 14 Drawing Sheet(s) Filed in Color)

(51) Int. Cl.
*G01V 3/30* (2006.01)
*E21B 47/09* (2012.01)
*E21B 49/00* (2006.01)

(56) References Cited

U.S. PATENT DOCUMENTS

| | | | | |
|---|---|---|---|---|
| 5,878,372 | A | 3/1999 | Tabarovsky et al. | |
| 6,442,488 | B2* | 8/2002 | Xiao | G01V 3/28 702/9 |
| 6,594,584 | B1* | 7/2003 | Omeragic | G01V 3/28 702/9 |
| 8,046,170 | B2* | 10/2011 | Merchant | G01V 3/28 702/7 |
| 9,057,797 | B2* | 6/2015 | Omeragic | G01V 3/28 |
| 10,012,028 | B2* | 7/2018 | Johnson | E21B 7/04 |
| 2005/0140373 | A1* | 6/2005 | Li | G01V 3/30 324/338 |
| 2007/0168133 | A1* | 7/2007 | Bennett | G01V 3/38 702/6 |
| 2007/0244646 | A1* | 10/2007 | Zhang | G01V 3/28 702/6 |
| 2009/0045075 | A1* | 2/2009 | Serebrianski | G01V 3/20 205/790.5 |
| 2009/0198447 | A1* | 8/2009 | Legendre | G01V 3/18 702/11 |
| 2009/0287416 | A1* | 11/2009 | Minh | G01V 11/00 702/7 |
| 2010/0057365 | A1* | 3/2010 | Merchant | G01V 3/28 702/7 |
| 2010/0176812 | A1* | 7/2010 | Bittar | G01V 3/24 324/339 |
| 2011/0231098 | A1* | 9/2011 | Omeragic | G01V 3/28 702/7 |
| 2012/0188091 | A1* | 7/2012 | Calleja | G01V 1/40 340/854.1 |
| 2013/0054145 | A1 | 2/2013 | Bittar et al. | |
| 2015/0047902 | A1* | 2/2015 | Tang | G01V 3/26 175/45 |
| 2015/0088426 | A1* | 3/2015 | Tang | E21B 47/026 702/7 |
| 2016/0003973 | A1* | 1/2016 | Guner | G01V 99/00 702/11 |
| 2016/0011331 | A1* | 1/2016 | Perkins | G01V 99/00 702/11 |
| 2016/0195633 | A1* | 7/2016 | Donderici | G01S 13/89 702/7 |
| 2017/0096887 | A1* | 4/2017 | Wilson | G06F 17/11 |
| 2017/0254921 | A1* | 9/2017 | Wu | G01V 3/28 |
| 2018/0292563 | A1* | 10/2018 | Zhong | G01V 3/38 |
| 2019/0128116 | A1* | 5/2019 | Thiel | G01V 3/38 |

OTHER PUBLICATIONS

Li et al., a. "New Directional Electromagnetic Tool for Proactive Geosteering and Accurate Formation Evaluation While Drilling", SPWLA 46th Annual Logging Symposium, Jun. 26-29, 2005. 16 pages.
Examination Report under Section 18(3) issued in United Kingdom patent application 1804058.4 dated Nov. 19, 2020, 2 pages.

* cited by examiner

METHODS AND SYSTEMS TO ANALYZE BED BOUNDARY DETECTION

CROSS-REFERENCE TO RELATED APPLICATIONS

The present application claims priority to U.S. Provisional Application 62/235,119 filed Sep. 30, 2015, the entirety of which is incorporated by reference.

FIELD OF THE INVENTION

Some embodiments described herein generally relate to downhole electromagnetic logging methods and more particularly to methods and systems for determining depths of investigation. Additional embodiments described herein generally relate to methods and systems for performing a full system statistical analysis to predict and improve a confidence level in bed detection distances.

BACKGROUND INFORMATION

Various wireline logging techniques may be used to survey oil or gas wells to determine their petrophysical or geophysical properties using various electronic measuring instruments. The electronic measuring instruments are directed into a borehole with a wireline cable, which transmits measurements made to a data processing system located at a surface above the borehole through electrical conductors in the wireline cable.

An alternative to wireline logging techniques is collection of data on downhole conditions during the drilling process. The availability of such information during the drilling process can allow a driller to modify or correct key steps of the operation to optimize performance. Various schemes for collecting data of downhole conditions and movement of the drilling assembly during the drilling operation are commonly referred to as measurement-while-drilling ("MWD"). Similar techniques which focus on measurement of formation parameters in lieu of the movement of the drilling assembly are commonly referred to as logging-while-drilling ("LWD"). The terms LWD and MWD, however, are often used interchangeably, and the use of either term in the subject matter disclosed will be understood to include both the collection of formation and borehole information, as well as data on movement and placement of the drilling assembly.

As petroleum reservoirs can generally be located in layered earth formations, the position of the borehole with respect to the boundaries of the formation layer often affects the productivity of the borehole. For example, under some conditions, drilling or landing the borehole near the top or upper layer boundary can be useful in distinguishing between locating hydrocarbons or water. Estimating distances to layer boundaries, therefore, can be useful for production well landing and drain-hole positioning.

Various LWD and MWD tools have been developed that provide information on distance to boundaries, formation resistivity, and orientation of formation boundaries. Such tools can introduce directional electromagnetic measurements through the use of tilted and transverse current-loop antennas, which allow for multi-spacing and multi-frequency azimuthally sensitive directional resistivity measurements. The multi-spacing and multi-frequency azimuthally sensitive directional resistivity measurements assist in monitoring distance to formation boundaries and their orientations to facilitate proactive well placement and, in combination with conventional LWD resistivity, the directional electromagnetic measurements allow for accurate structure and formation resistivity interpretation around the borehole and provide information upon which steering decisions may be made, for example, distance and direction to a remote bed. For example, Schlumberger developed a PERISCOPE™, GEOSPHERE™, and other deep directional resistivity tools, among others, which can incorporate tilted and transverse antennas, for example, in drilling collars. Such tools can facilitate providing information to determine distance to boundaries, as well as the resistivities of formation and shoulder beds, and the orientation in azimuth of the formation boundaries.

One characteristic of use of such tools is to determine a depth of investigation ("DOI"). The DOI can be characterized as a distance of how far a logging tool measures into the formation from a face of the tool or borehole wall. The depth of investigation summarizes the radial response of the tool measurements in one or more directions.

In order to derive reasonable DOIs, a radius of boundary detection from the logging tool can depend on the resistivities of the formation beds, the transmitter-receiver spacings, frequencies of the measurements, and a threshold level above which the measured electromagnetic signals can be considered reliable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method to determine a depth of investigation ("DOI") is disclosed. In one non-limiting embodiment, the method may include generating an error distribution model for a logging tool. The method may also include defining a detection threshold above which a measured signal from a measurement channel of the logging tool can be considered reliable based on output from the error distribution model, and generating a simulated formation model to determine the depth of investigation. The depth of investigation may be biased by the detection threshold.

A method to determine distances to a bed boundary of an earth formation is disclosed. In one non-limiting embodiment, the method may include acquiring input data for a logging tool, constructing a forward model based on the input data, and applying a plurality of errors to the forward model. The method may also include generating inverted maps corresponding to horizontal resistivities of the earth formation by applying an inversion technique to the forward model to predict distances to the bed boundary, where application of the plurality of errors to the forward model can generate corresponding inverted maps. The method may also include defining a threshold to compare the predicted distances to the bed boundary with a true formation model which provides true distances to the bed boundary, and displaying results that exceed the threshold.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
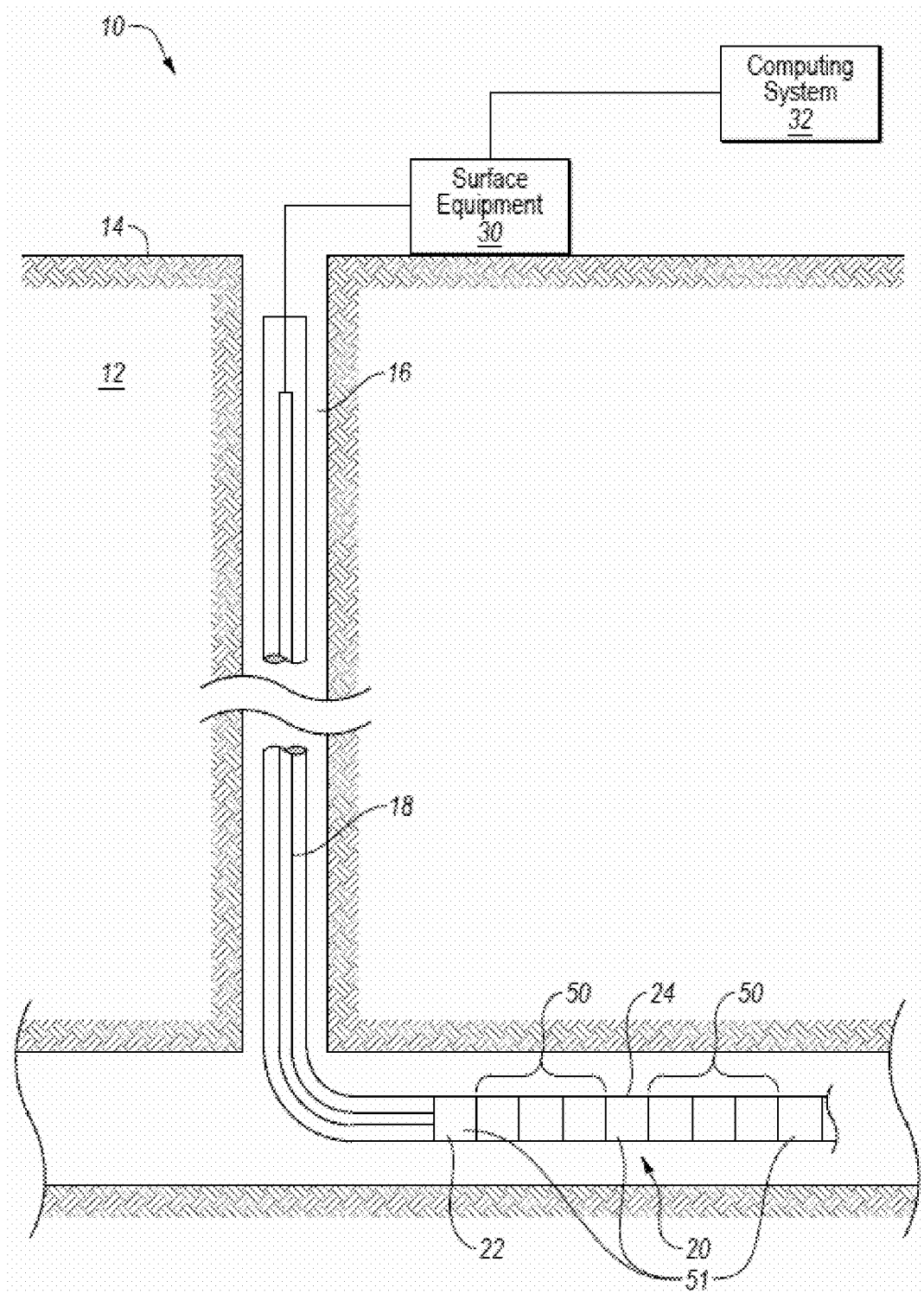
FIG. 1 depicts a system according to one or more embodiments disclosed herein that is in a drilling environment.

FIG. 1 depicts an embodiment of a system 10 for calculating a DOI. The system 10 can be onshore or offshore. In some embodiments, as depicted in FIG. 1, the system 10 includes a subterranean region 12 beneath a ground surface 14, for example, when a drill site is located onshore. The subterranean region 12 can include one or more subsurface layers, such as, for example, sedimentary layers, rock layers, or the like. In some implementations, the subterranean region 12 can include one or more subterranean formations below a seabed, for example, when a drill site is located offshore. The subterranean region 12 includes a borehole 16 that penetrates the subterranean region 12. The borehole 16 can be adapted for use in connection with a vertical well, horizontal well, slanted well, curved well, or any combination of such wells. The system 10 includes a drill string 18 that extends into the borehole 16 and includes a bottomhole assembly 20 (BHA), a drill bit (not shown), and a logging tool 22 suitable for making downhole logging measurements. The drill string 18 may further include other suitable downhole tool components, such as, a rotary steerable tool, downhole telemetry system, and one or more MWD or LWD tools including various sensors for sensing downhole characteristics of the borehole 16 and the surrounding formations.

The logging tool 22 includes a resistivity array 24. The resistivity array 24 can include any number of transmitters, which are denoted by numeral 50 in FIG. 1, and any number of receivers, which are denoted by numeral 51 in FIG. 1. For example, in the logging tool 22 depicted in FIG. 1, the resistivity array 24 includes a plurality of transmitters and receivers spaced apart axially along a body of the logging tool 22. The transmitters 50 and receivers 51 can include axial, tilted, and transverse antennas. As is known in the art, application of a time varying electric current in the transmitter 50 antennas produces a corresponding time varying magnetic field in the formation. The magnetic field in turn induces eddy currents in the conductive formation. These eddy currents further produce secondary magnetic fields which may produce a voltage response in one or more of the receiver 51 antennas. The measured voltage can be processed to obtain one or more measurements of the secondary magnetic field, which may in turn be further processed to estimate various formation properties such as resistivity, resistivity anisotropy, distance to a remote bed, apparent dip angle, dip azimuth angle, or the like, collectively referred to herein as well log data 26, through a corresponding measurement channel. For example, transmitters 50 can generate electromagnetic waves at select frequencies that are received by the receivers 51 after travelling through the formation. An amplitude and a phase difference between the electromagnetic wave can be measured and a resistivity measurement derived for a particular depth, in addition to various other attenuation measurements. The well log data 26 can therefore include phase-shift, amplitudes, and attenuation data obtained from various transmitter-receiver pairs and at multiple frequencies.

The system 10 further includes surface equipment 30 that can include various components that are operatively coupled to the logging tool 22. For example, the surface equipment 30 may include a controller that controls the operation of the logging tool 22 and the acquisition of the well log data 26. The logging tool 22 and the surface equipment 30 can be communicatively coupled to a computing system 32. For example, the system 10 can include communication or telemetry equipment to communicate or transmit the well log data 26 to the computing system 32. The communication or telemetry equipment may be communicatively coupled to the computing system 32 via one or more communication channels such as a wire based network, wireless network, or combination of networks.

The computing system 32 is configured to process the acquired well log data 26. The computing system 32 can include a memory, a processor, and input/output controllers communicatively coupled to the processor via a communication bus. The memory can include one or more volatile storage devices, for instance random access memory (RAM), and one or more non-volatile storage devices, for instance read only memory (ROM), Flash memory, magnetic hard disk (HDD), optical disk, solid state disk (SSD), and the like. The input/output controllers can be coupled to input/output devices, such as a monitor, a mouse, a keyboard, or the like and to the communication or telemetry equipment. The input/output devices are configured to receive and transmit data in analog or digital form over communication channels. The memory can store instructions associated with an operating system, computer applications, and other resources. The computer applications can include software applications, scripts, functions, executables, or other modules that are interpreted or executed by the processor. In particular, the processor can execute instructions to generate output data based on input data, such as the well log data 26.

Figure 2:
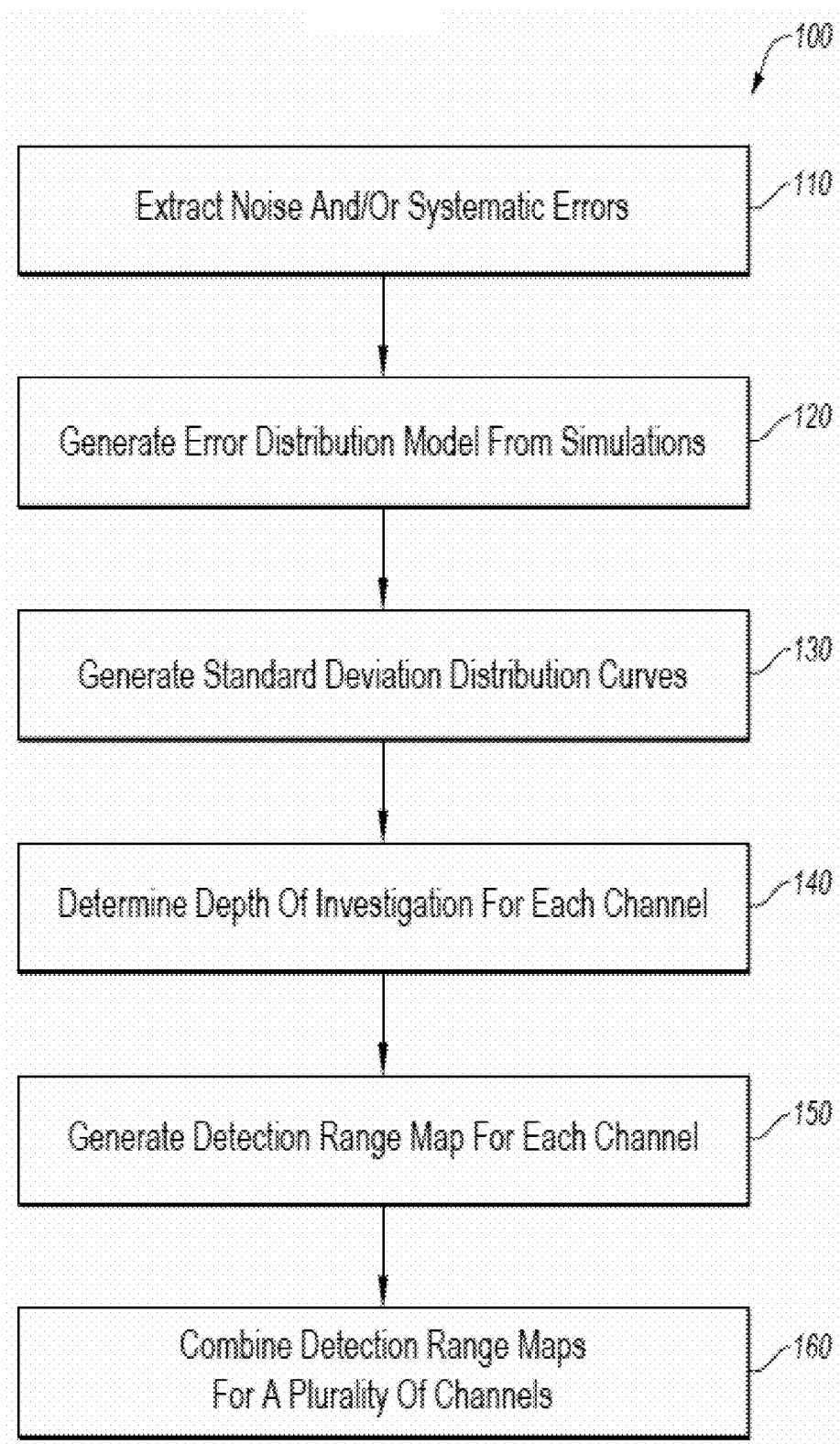
FIG. 2 depicts a method to determine a depth of investigation according to one or more embodiments disclosed herein.

FIG. 2 depicts a method 100 to generate DOIs that can be used in connection with one or more embodiments of the systems disclosed herein, for example, the system 10 of FIG. 1. For example, the method 100 can process the well log data 26 acquired from each measurement channel of the logging tool 22 to calculate the DOI in an accurate and precise manner, using one or more computing systems, for example, computing system 32. As discussed above, the well log data, for example, well log data 26 from the logging tool 22, can be acquired by a computing system, for example, computing system 32 for further processing and analysis. The well log data 26 can be acquired from one or more field jobs. The well log data 26 can include data from one or more measurement channels. At block 110, noise and/or systematic errors are extracted from acquired data, such as, for example, data acquired from the well log data 26 for each measurement channel, simulations, and other measurements. Such other measurements can include, for example, data acquired from lab measurements, data acquired from measurements of specific wells, or the like.

The noise and/or systematic errors extracted at block 110 are used to generate an error distribution model at block 120. The error distribution model can be generated, for example, to remove environmental effects present during collection of the well log data, for example, well log data 26, measurements, for example, lab measurements, or simulations. The errors in the well log data, measurements, or simulations caused by the environmental effects can be defined as, for example, noise errors and systematic errors, as noted above. Noise errors can include electronic noise, fluctuation-induced noise, receiver tool face angle measurement noise, transmitter-receiver alignment angle noise, and the like. Systematic errors can include gain mismatch, title angle, alignment angle and bending, and the like. Thus, the noise and systematic errors obtained from the acquired well log data 26, lab measurements, or simulations can be applied to the error distribution model, which may apply a random generation of errors to determine the error distribution. The error distribution model can be defined by various mathematical functions and algorithms, such as Gaussian error assumption, homogeneous error assumption, Laplacian error assumption, and the like.

At block 130, standard deviation distribution for each measurement channel is generated from the error distribution model to obtain a detection threshold. As discussed above, the detection threshold is a threshold level above which a measured signal can be considered reliable. Thus, to obtain the standard deviation distribution, the error model distribution model is used at one or more simulations or scenarios, with the errors, such as noise and systematic errors, obtained from the well log data 26, for example, applied to the error distribution model. The simulations or scenarios, for example, a simulation corresponding to a homogenous medium (e.g., isotropic or anisotropic media) with arbitrary dip, can include running the tool forward modeling simulation by applying the error distribution model with adjusting resistivity values, frequencies, transmitter-receiver distances, and the like.

Figure 3:
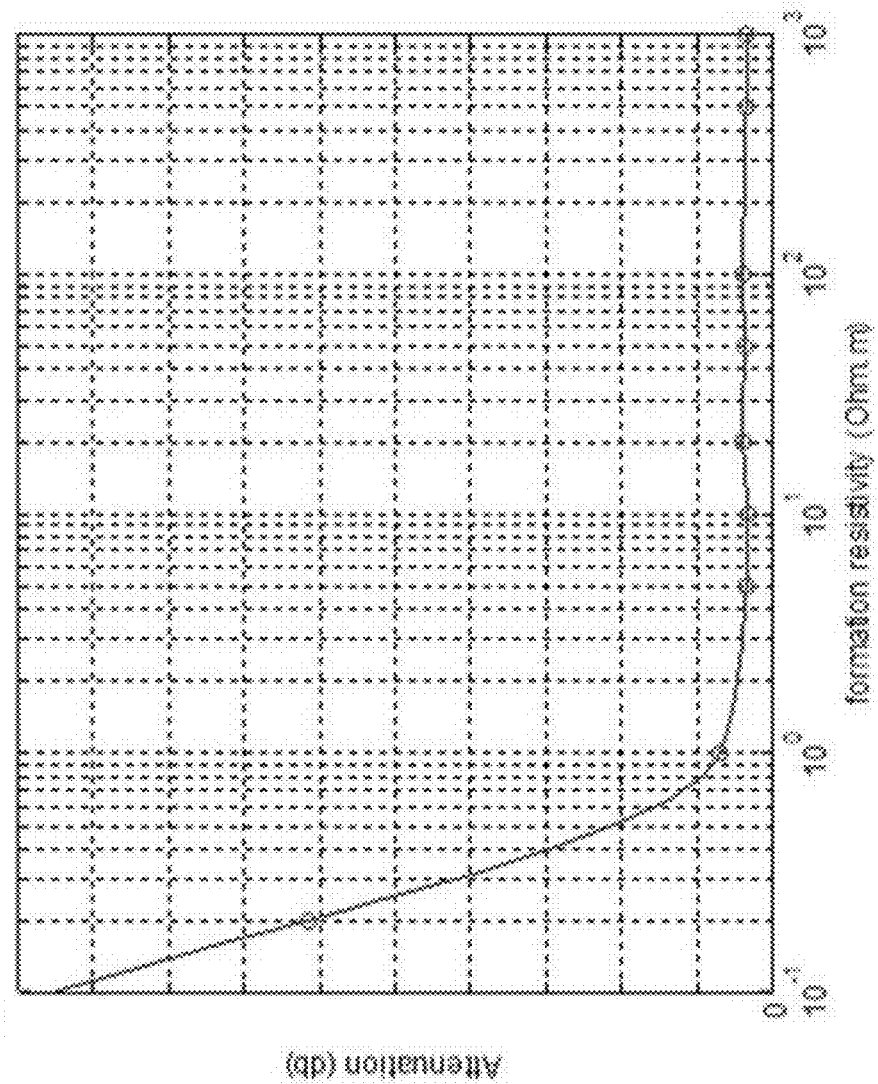
FIG. 3 depicts an example of a standard deviation distribution that is generated for one measurement channel according to one or more embodiments disclosed herein.

FIG. 3 depicts an example of a standard deviation distribution illustrated in a graph format, obtained according to the systems and methods disclosed herein. An x-axis represents a formation resistivity in Ohm·m and a y-axis represents attenuation in decibels from one measurement channel, where the attenuation in the y-axis increases vertically from 0 decibels and the formation resistivity increases horizontally from 0.1 Ohm·m from a point where the x and y axes intersect. The standard deviation distribution of FIG. 3 was obtained from forward modeling simulations with an error distribution model built from well log data obtained from a large number of field jobs covering different locations. Thereafter, the error distribution model was run under one hundred simulations or scenarios.

Figure 4:
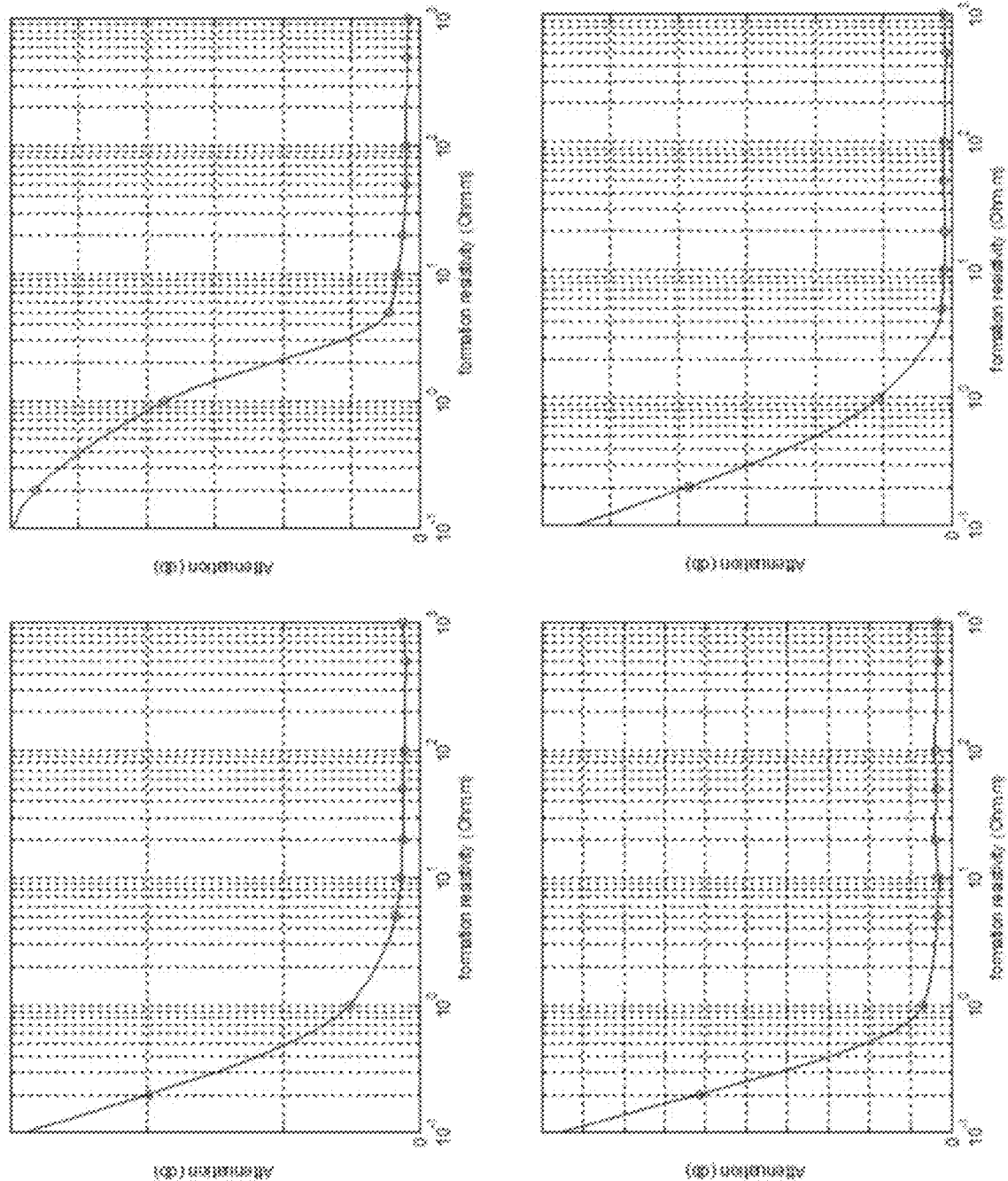
FIG. 4 depicts examples of standard deviation distributions that are generated for four different measurement channels according to one or more embodiments disclosed herein.

While FIG. 3 depicts one example of a standard deviation distribution for one measurement channel, the methods and systems disclosed herein can generate similar standard deviation distributions for a plurality of measurement channels. For example, FIG. 4 depicts standard deviation distributions for four different measurement channels.

At block 140, using the detection thresholds determined for each measurement channel from the standard deviation distributions, DOI for each measurement channel is determined. In one implementation, to generate the DOI for each measurement channel, simulated formation models can be constructed. For example, multiple parametrized formation models of the subsurface area can be created based on the error distributions, well log data, and the detection thresholds generated from the standard deviation distributions at block 130. In some embodiments, the parametrized formulation models can include a plurality of formation and borehole related parameters, such as formation resistivity, invasion diameter, borehole size, mud resistivity, Young's modulus, Poisson coefficient, shear modulus, or the like. Thereafter, one or more tool responses can be generated corresponding to the multiple parametrized formation models to generate the DOI.

In one embodiment, a simulated formation model is generated where a formation is modeled as a single boundary with a formation layer positioned above or below a shoulder layer. Various tool responses can be simulated to generate the DOI. For example, in some embodiments, simulation model codes, such as, for example, ANISBEDS, can be used to simulate the tool response while moving the tool far away from a bed boundary at a fixed or variable interval to across the bed boundary. In some embodiments, simulated models, such as ANISBEDS, can include a 1D spectral integral code for computing induction and tool responses in an arbitrary number of dipping anisotropic beds. In some embodiments, the simulated model can compute complex, vector-valued magnetic fields and electric fields at any position with respect to arbitrarily oriented transmitters. Various scenarios that can be expected to be encountered can be applied to generate resistivity values for the formation and shoulder layers. For each such scenario, the DOI can be generated and recorded for each pair of resistivity values for the formation and shoulder layers.

Figure 5:
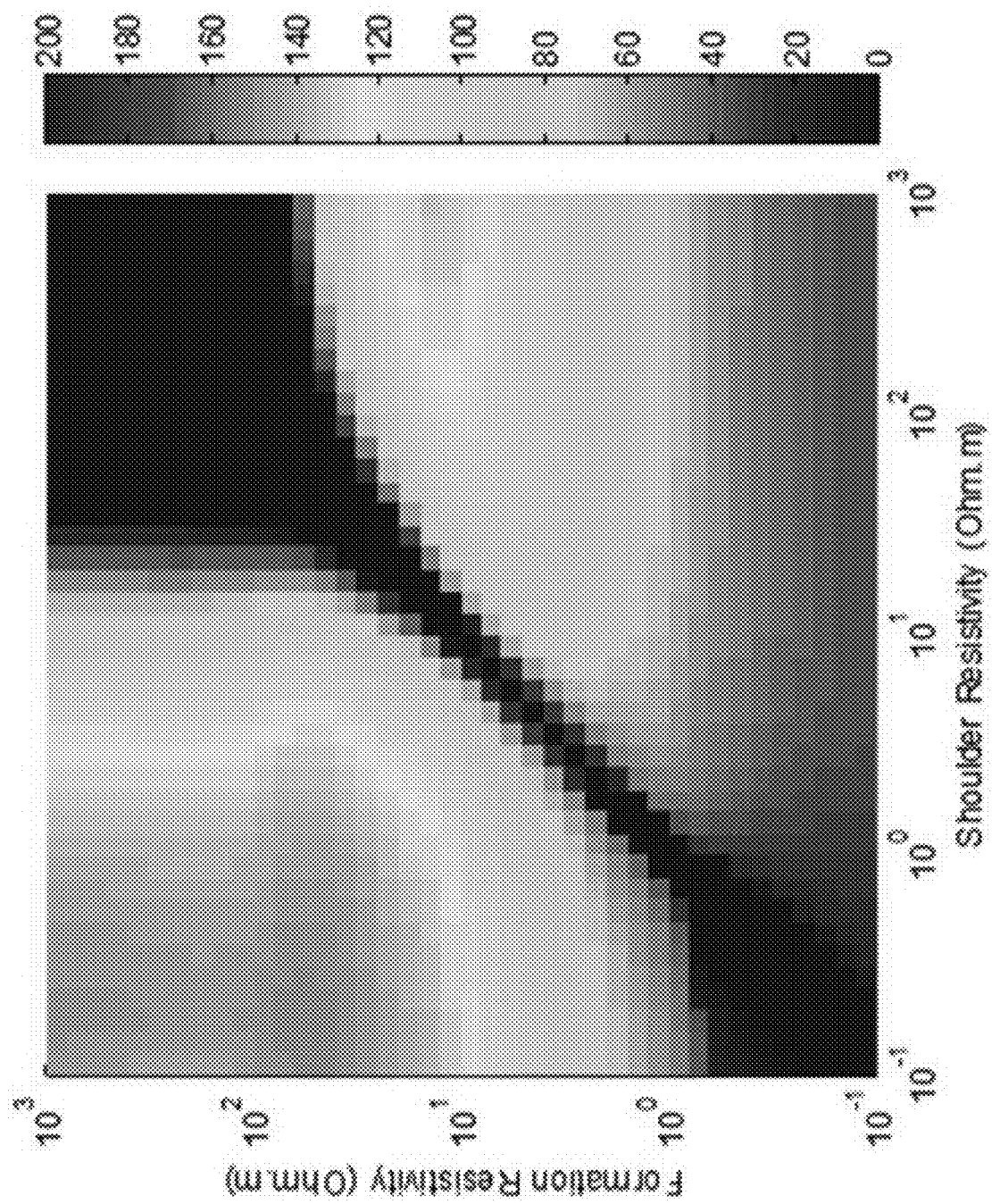
FIG. 5 depicts a detection range map generated for one measurement channel according to one or more embodiments disclosed herein.

At block 150, a detection range map is generated based on the determination of DOIs for each pair of resistivity values for the formation and shoulder layers. For example, FIG. 5 depicts a detection range map generated based on the methods and systems disclosed herein for one measurement channel. The detection range map of FIG. 5 was generated for a logging tool that is positioned in a horizontal well and is moving from 250 feet away toward a single boundary. Further, the simulated formation model was constructed for a transmitter-receiver spacing of 110 feet and the formation and shoulder resistivities were iterated through a predefined range of 0.1 Ohm·m to 1000 Ohm·m. As shown in FIG. 5, an x-axis represents the resistivity of an approaching bed, i.e., shoulder resistivity, and a y-axis represents the resistivity of the formation the tool is located in, i.e., formation resistivity. In some embodiments, the detection range map provides a gauge of sensitivity under different resistivity contrasts represented via color-coded detection ranges. In other embodiments, the detection range map can provide a gauge of sensitivity under different resistivity contrasts which may be represented via detection ranges represented in a grey scale, black and white, or other suitable techniques and mediums to render a gauge of sensitivity under different resistivity contrasts. As depicted in the detection range map of FIG. 5, for example, with a shoulder bed resistivity of 1 Ohm·m or less and a formation resistivity larger than 10 Ohm·m, this measurement channel is capable of detecting a presence of a shoulder bed more than 140 feet around the borehole.

Figure 6:
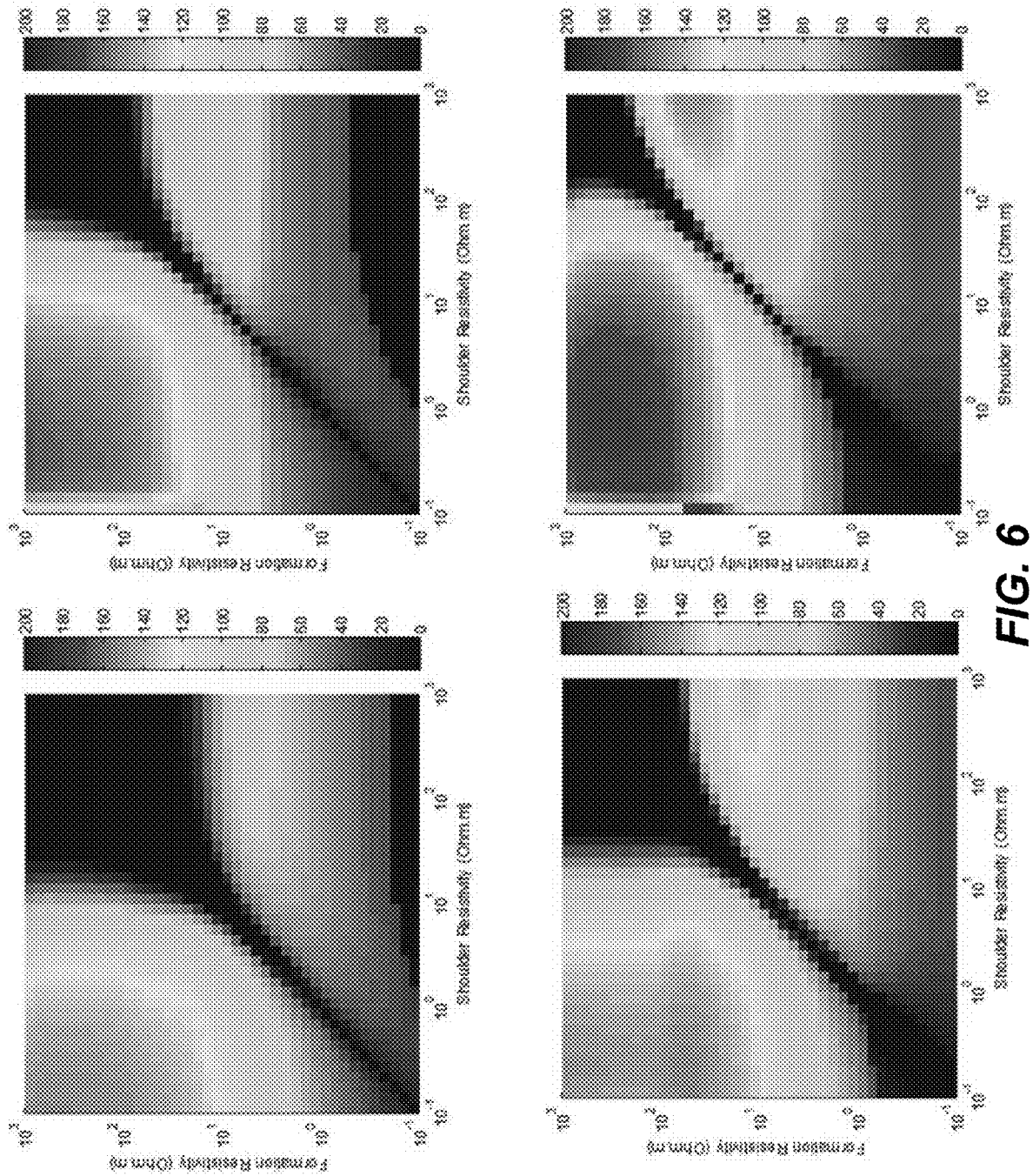
FIG. 6 depicts detection range maps generated for four different measurement channels according to one or more embodiments disclosed herein.

While FIG. 5 depicts one example detection range map for one measurement channel, the methods and systems disclosed herein can generate similar detection range maps for a plurality of measurement channels, where the measurement responses are biased away based on the detection thresholds determined from the standard deviation distributions generated at block 130. For example, FIG. 6 depicts detection range maps for four different measurement channels. Again, in some embodiments, the detection range maps can provide a gauge of sensitivity under different resistivity contrasts which may be represented via detection ranges represented in a grey scale, black and white, or other suitable techniques and mediums to render a gauge of sensitivity under different resistivity contrasts for the different measurement channels.

Figure 7:
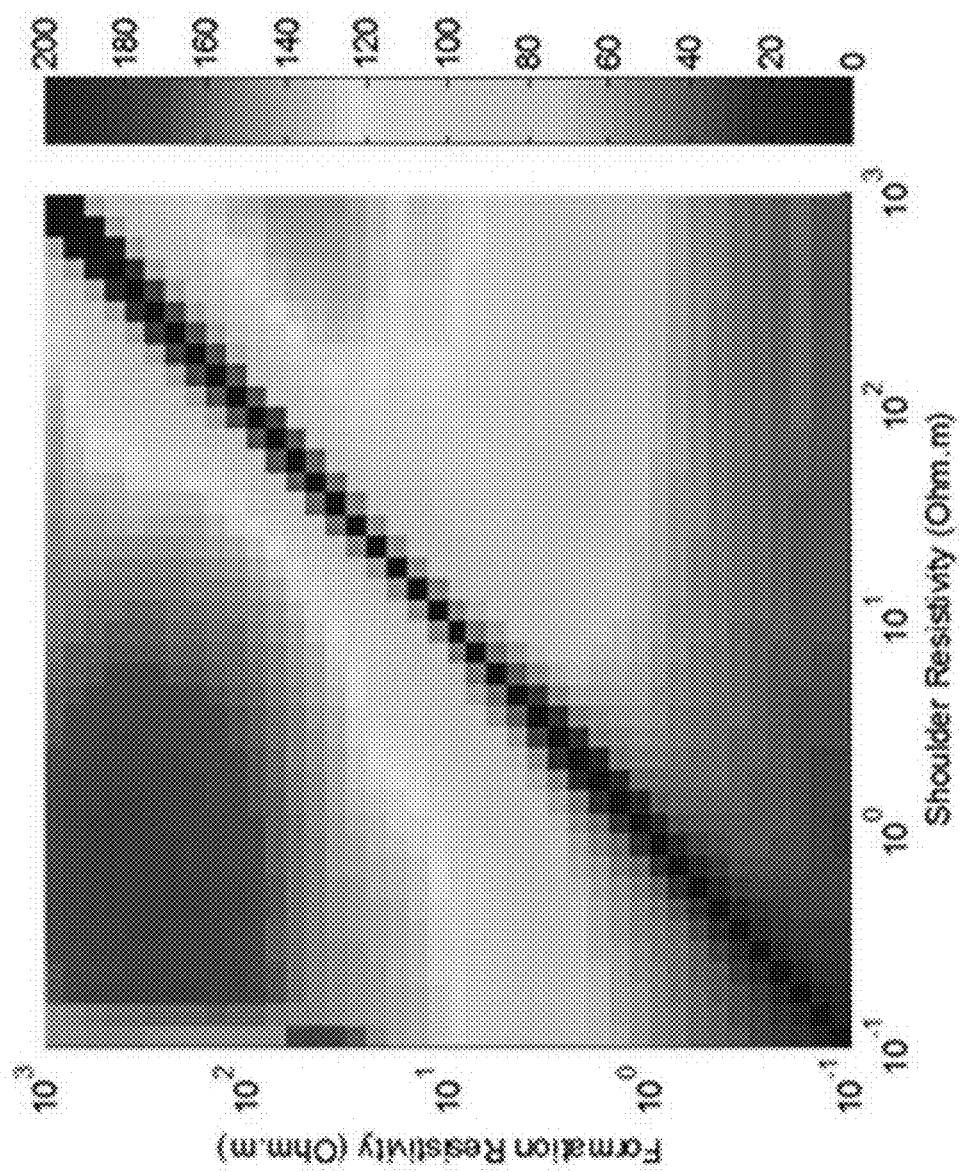
FIG. 7 depicts a detection range map generated from combining maximum Depths of Investigation generated from a plurality of measurement channels.

At block 160, the detection range maps from the measurement channels can be combined to generate a single detection range map. In some embodiments, the maximum DOI for each measurement channel and for each transmitter-receiver pair can be combined to generate a single detection range map. For example, FIG. 7 depicts a detection range map generated from combining a maximum DOI generated for each measurement channel from a total of 48 measurement channels, and at each transmitter-receiver pair. Again, in the combined detection range map, the x-axis represents the resistivity of an approaching bed, i.e., shoulder resistivity, and the y-axis represents the resistivity of the formation the tool is located in, i.e., formation resistivity. As discussed above, the detection range map provides a gauge of sensitivity under different resistivity contrasts represented via color-coded detection ranges. As shown in FIG. 7, the detection range map indicates that the maximum DOI for this tool can be approximately 180 feet. Again, in some embodiments, the detection range map can provide a gauge of sensitivity under different resistivity contrasts which may be represented via detection ranges represented in a grey scale, black and white, or other suitable techniques and mediums to render a gauge of sensitivity under different resistivity contrasts for the maximum DOI for this tool.

Figure 8:
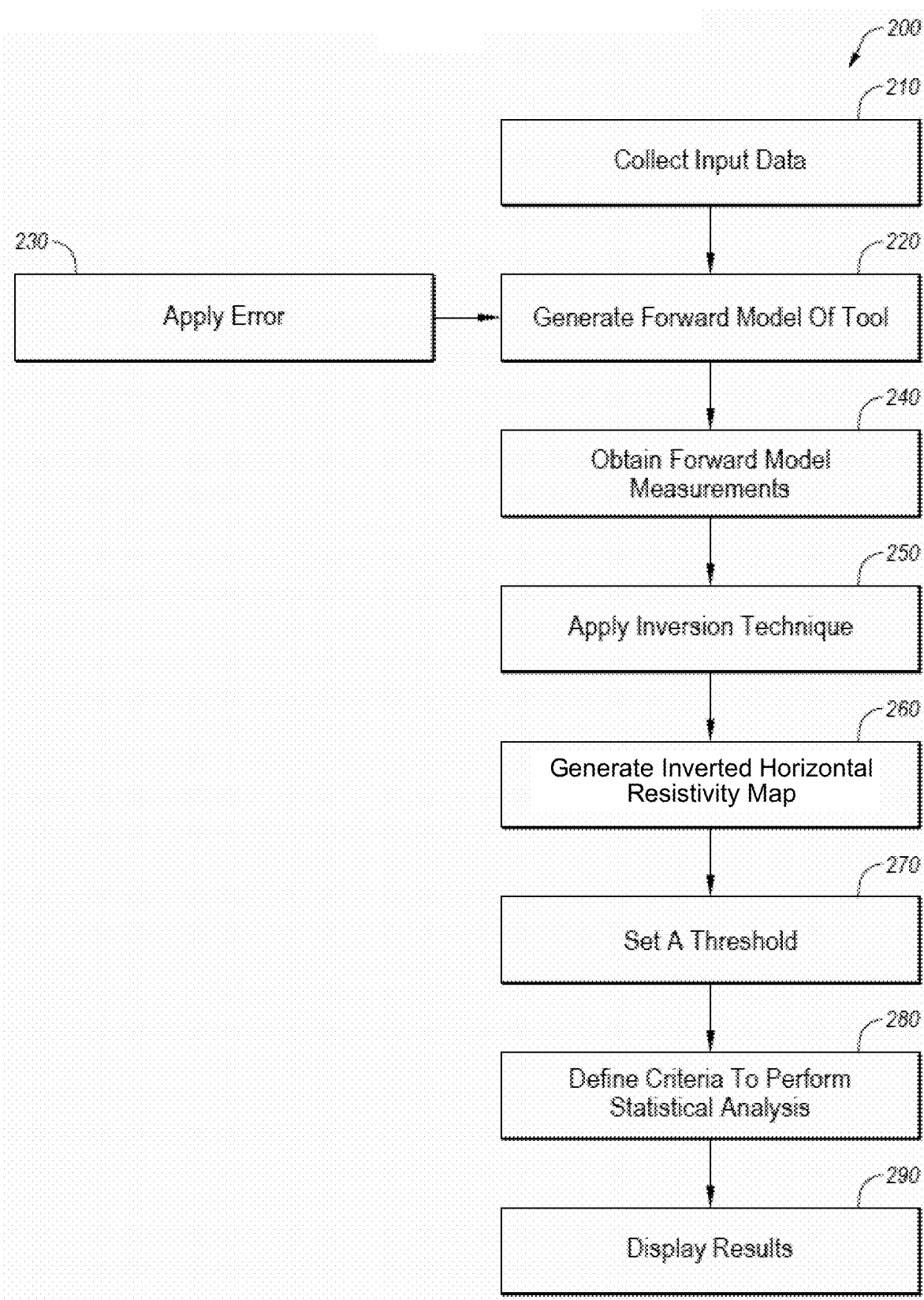
FIG. 8 depicts a method to predict a distance to a bed boundary according to one or more embodiments disclosed herein.

The methods and systems disclosed herein can be further used to improve a confidence level in a predicted distance to bed boundaries. FIG. 8 depicts an example method 200 for predicting a distance to a bed boundary. At block 210, input data is collected that can be used to predict the distance to the bed boundary. The input data can include a definition of the logging tool, a trajectory of the tool in the formation, a model of the formation, well log data, offset well log data, and the like. At block 220, a forward model is generated using the input data generated at block 210. The forward model can be generated on one or more mainframe computer systems, mini-computer systems, workstation computer systems, personal computer systems, and/or server computer systems using algorithms known in the art. In some embodiments, the forward model can be generated based on iterative 1D, 2D, and/or 3D forward modeling algorithms. In general, the forward model can be generated to compare the model responses with the actual well log data, such as, for example, amplitudes, phase-shifts, attenuations, or the like. Using the iterative 1D, 2D, and/or 3D forward modeling algorithms, the model responses can be adjusted to match the actual well log data.

At block 230, errors are applied to the forward model at each depth. Again, the errors can include noise errors, such as, electronic noise, fluctuation-induced noise, receiver tool face angle measurement noise, transmitter-receiver alignment angle noise, and the like. The errors can also include systematic errors, such as, gain mismatch, title angle, alignment angle and bending, and the like. Applying the input data and the noise and systematic errors to the forward model and running the forward model under various pre-defined scenarios causes various measurements to be output at block 240. Such measurements can be related to, for example, complex, vector-valued magnetic fields and the electric fields at any position, anisotropy parameters, and other various induction-type measurements in formation geometries.

At block 250, an inversion technique is applied to the forward model using various algorithms known in the art for a number of simulated conditions. In some embodiments, 1D, 2D, and/or 3D mathematical inversion algorithms can be applied, which use numerical optimization algorithms to solve for amount, depth, and lateral distribution of horizontal and vertical resistivities. In some embodiments, 1D parametric or stochastic inversion techniques can be used to solve for amount, depth, and lateral distribution of horizontal and vertical resistivities, as well as the distance to boundary, dip angle, and azimuth angle, and the like.

Figure 9:
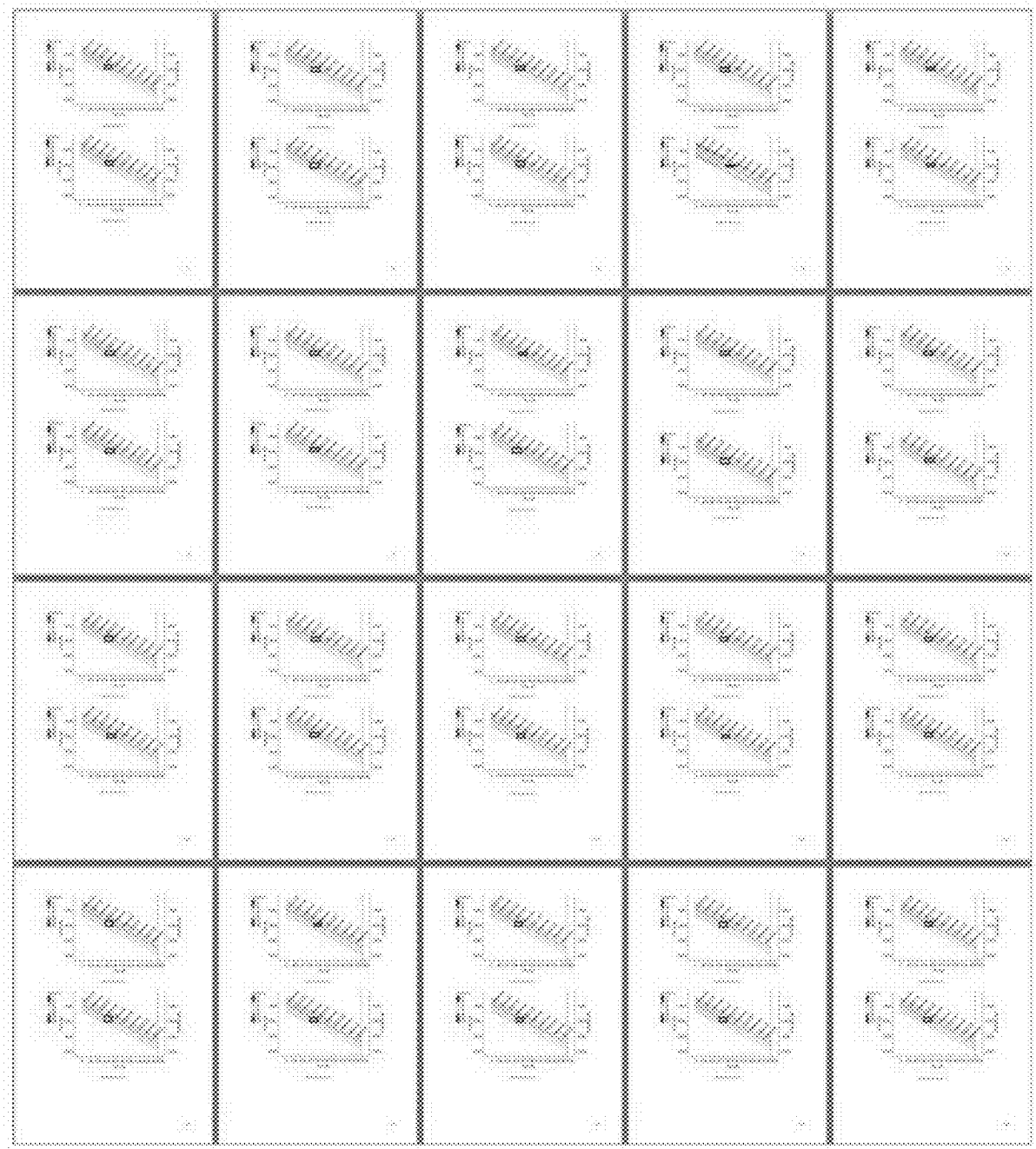
FIG. 9 depicts a color map of inverted horizontal resistivities that are generated according to one or more embodiments disclosed herein.

At block 260, in one embodiment, a color map of inverted horizontal resistivity (Rh) is generated based on the one or more inversion techniques applied at block 250. In other embodiments, a map of inverted horizontal resistivity (Rh) can be generated in a grey scale, black and white, or other suitable techniques and mediums to render a map of inverted horizontal resistivity (Rh). The map of inverted horizontal resistivity (Rh), for example, can be generated based on a number of simulation runs and for various scenarios that a logging tool is expected to encounter. For example, FIG. 9 depicts a color map of an inverted horizontal resistivity that was generated based on forty simulation runs for a landing case, where the formation is modeled with a trajectory of 75 degrees and formation dip of 0 degrees. As depicted in FIG. 9, each simulated run will generate an inverted horizontal resistivity map that may be different from the other as the errors for each simulated run may be different based on random generation of errors. Such horizontal resistivity maps, while useful, often are time consuming and tedious for a user to interpret, in terms of earliest boundary detection position.

Thus, to assist a user in analyzing and interpreting the inverted horizontal resistivity maps, at block 270, the method 200 defines a threshold for analyzing and interpreting the inverted horizontal resistivity maps. The threshold can be defined and set so that the user may view resistivity values that exceed the threshold. For example, in some embodiments, a color scale can be applied to the images of the inverted horizontal resistivity maps so that a user may see resistivity values that exceed a threshold, such as, resistivity values that result in a different color. In some embodiments, the threshold can be defined by the following equation:

$$\frac{1}{R_{Threshold}} = \frac{\text{level}}{R_{top}} \frac{1-\text{level}}{R_{bottom}}$$

where: $R_{Threshold}$ is a threshold resistivity; level is a relative level being tested; $R_{top}$ is a resistivity of a top layer; and $R_{bottom}$ is a resistivity of a bottom layer.

The level can be selected based on a user's desired criteria. For example, the user can select a level of 25%, 50%, 75%, etc. Selecting a lower level, such as, for example, 25% may improve sensitivity. Selecting a higher level, on the other hand, such as, for example, 75%, may make the results less sensitive but more robust. In some embodiments, the threshold can be used to assist the user in determining a distance to the boundary in terms of the total vertical distance (TVD) of a borehole, in particular, assessing when the threshold has exceeded. Performing a statistical analysis of the results that have exceeded the threshold can facilitate realizing confidence levels in the distances to the boundaries. Thus, at block 280, criteria can be defined and set to interpret the results. For example, in some embodiments, the criteria can be defined by one or more of the following: detection of the first data point where the threshold of the inverted horizontal resistivity ($R_H$), for example, is exceeded; predicting three consecutive data points where the threshold is exceeded; predicting three data points where the TVD predicted is within a defined range, such as, for example, within 3 feet, 6 feet, 9 feet, or any other desired range.

Figure 10:
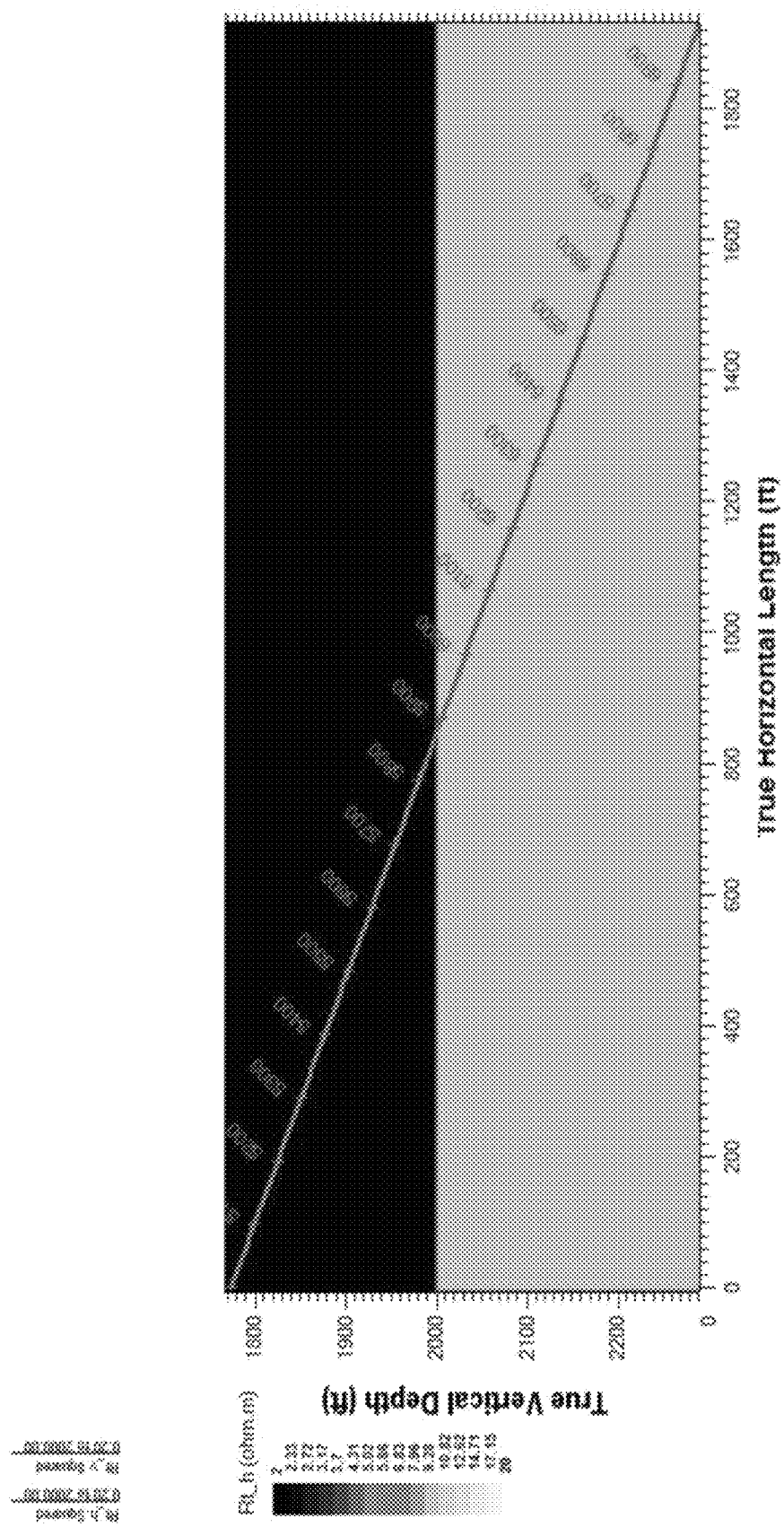
FIG. 10 depicts a true resistivity model of an example scenario according to one or more embodiments disclosed herein.
Figure 11:
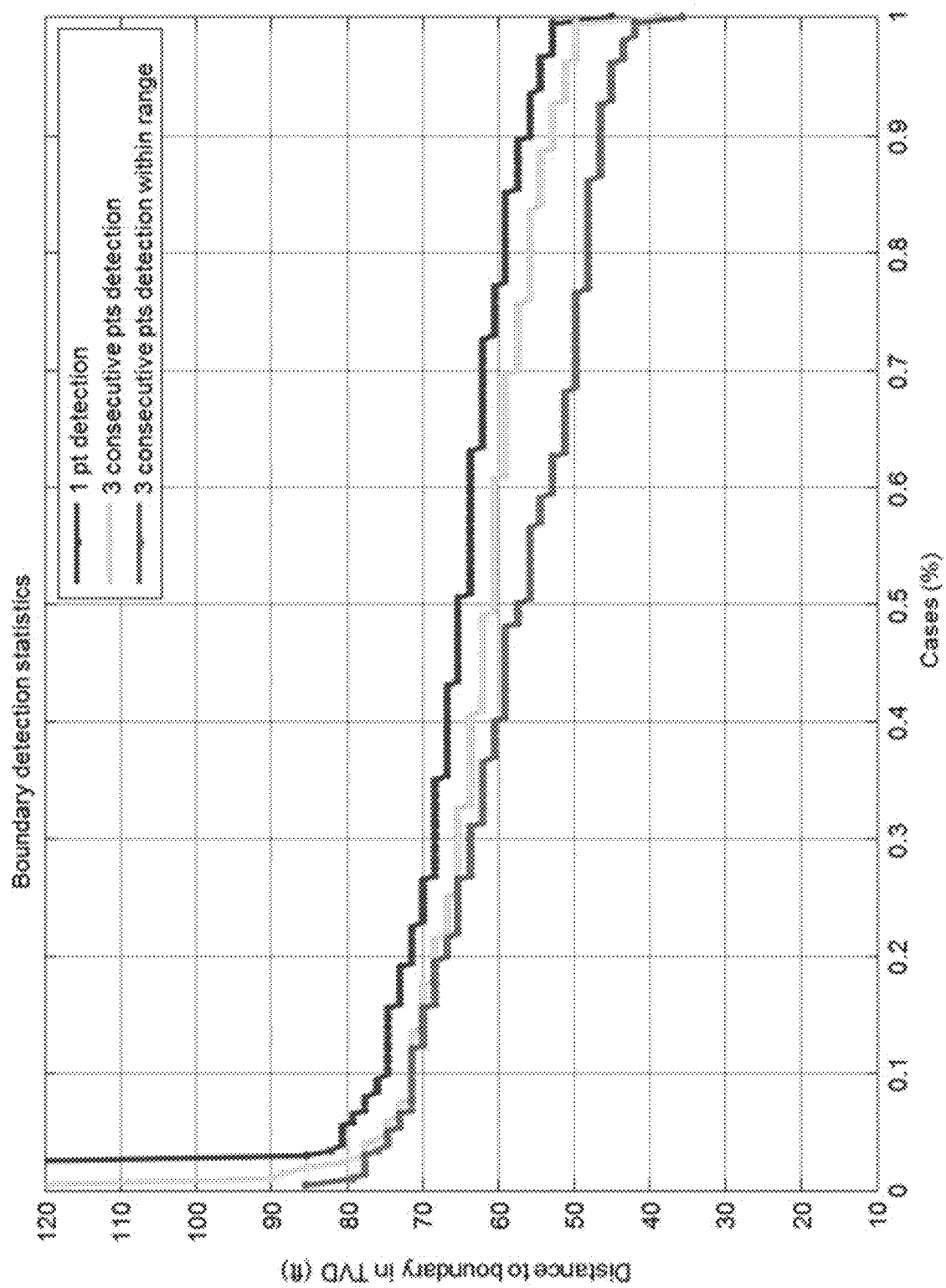
FIG. 11 depicts cumulative results of distances to bed boundaries that are generated according to one or more embodiments disclosed herein.

FIG. 10 depicts an example of a true resistivity model of the landing case discussed above. An x-axis represents a true horizontal length, a y-axis represents a true vertical depth, and a color code represents a true formation resistivity ($R_T$). In particular, as depicted in FIG. 10, a true boundary between an upper layer and a lower layer is defined at 2000 feet. As discussed above, inverted horizontal resistivity maps for different simulated conditions may result in different inverted horizontal resistivity maps. Thus, applying a desired threshold, for example, 25%, 50%, 75%, etc., at block 270, the results that exceed the desired threshold when compared to the true resistivity model can be displayed at block 290 based on a criteria defined and set at block 280 at each depth. For example, FIG. 11 depicts cumulative results that were obtained for 200 simulated runs or realizations, where the threshold was defined based on a 50% level, and the prediction of the defined range was selected at 6 feet. An x-axis represents a percentage of realizations, a y-axis represents a distance to the true boundary, and the three curves: 1 pt [point] detection; 3 consecutive pts [points] detection; and 3 consecutive pts [points] detection within range, represent data that met the criteria. As depicted in FIG. 11, generating the results obtained based on the methods and systems disclosed herein, one can determine distances to bed boundaries with varying levels of confidence. For example, the 1 pt detection curve of FIG. 11 depicts that there are more than 80% realizations in which the bed boundary can be detected 60 feet away for this scenario. The 3 consecutive pts [points] detection curve of FIG. 11 depicts that a bed boundary which is 60 feet away can be predicted within a 60% confidence level. The 3 consecutive pts [points] detection within range curve of FIG. 11 depicts that a bed boundary that is 60 feet away can be predicted within a 6 feet range at a 40% percent confidence level.

Figure 12:
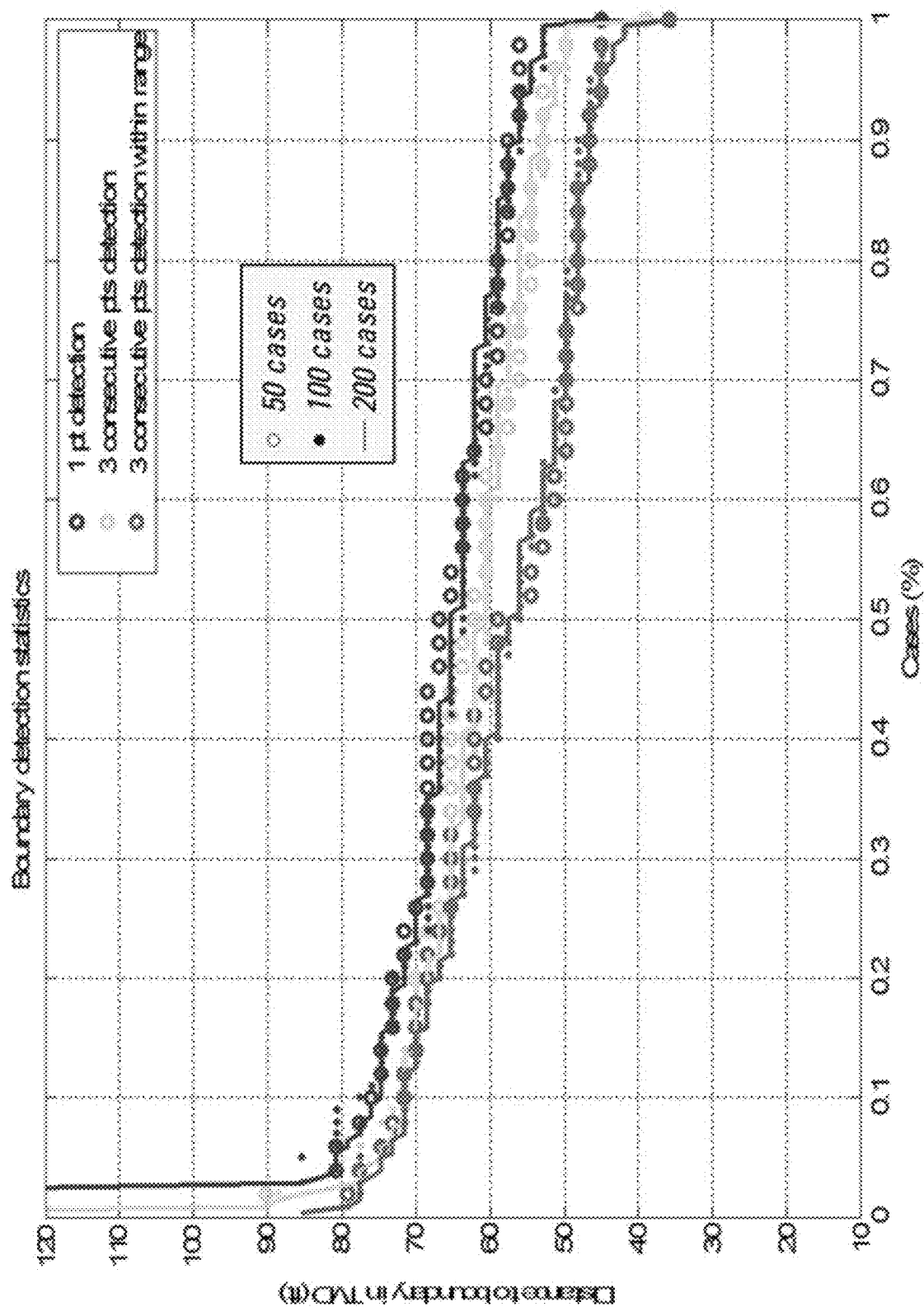
FIG. 12 depicts a comparison of cumulative results of distances to bed boundaries that are generated according to one or more embodiments disclosed herein.
Figure 13:
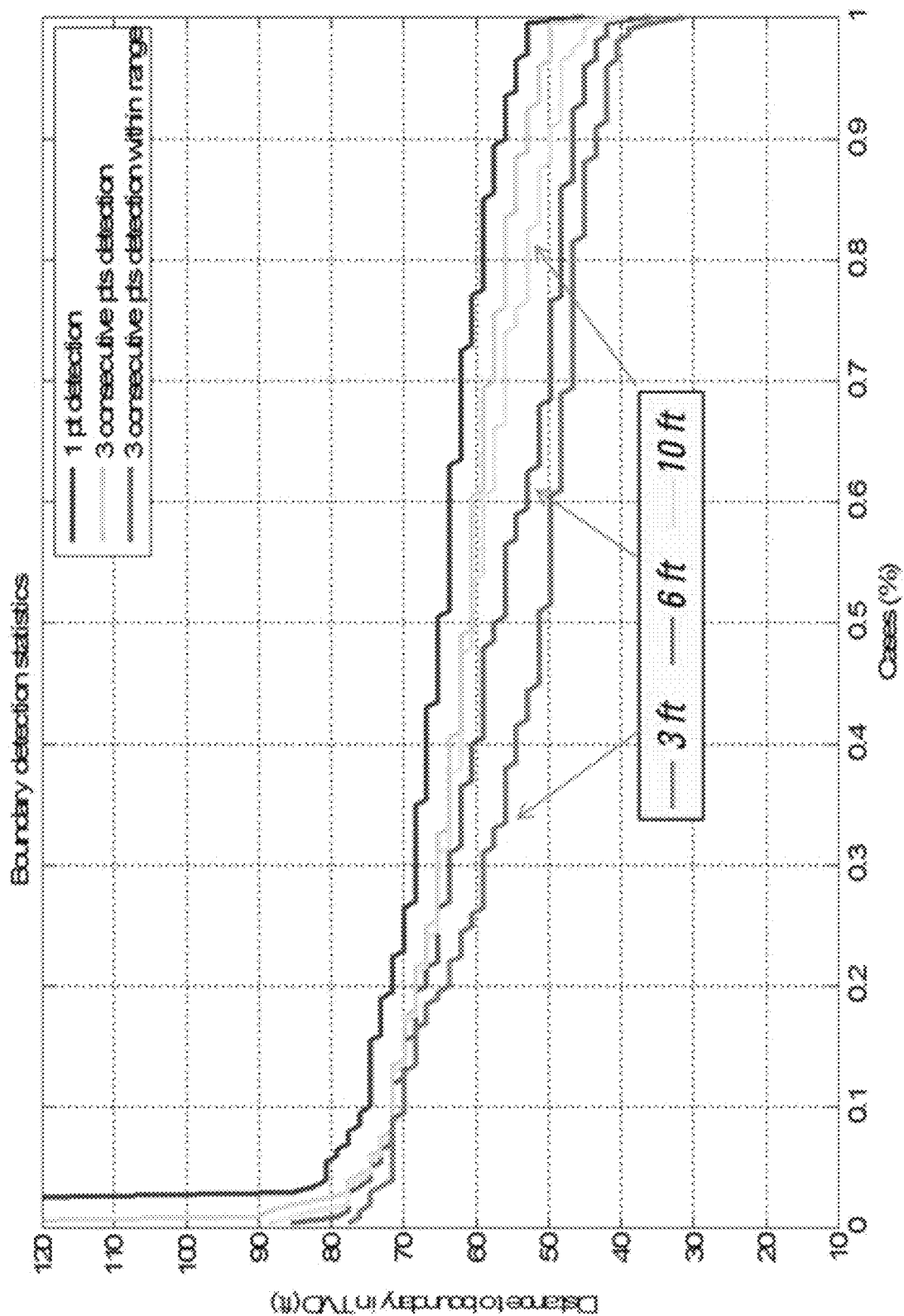
FIG. 13 depicts a comparison of cumulative results of distances to bed boundaries that are generated according to one or more embodiments disclosed herein.
Figure 14:
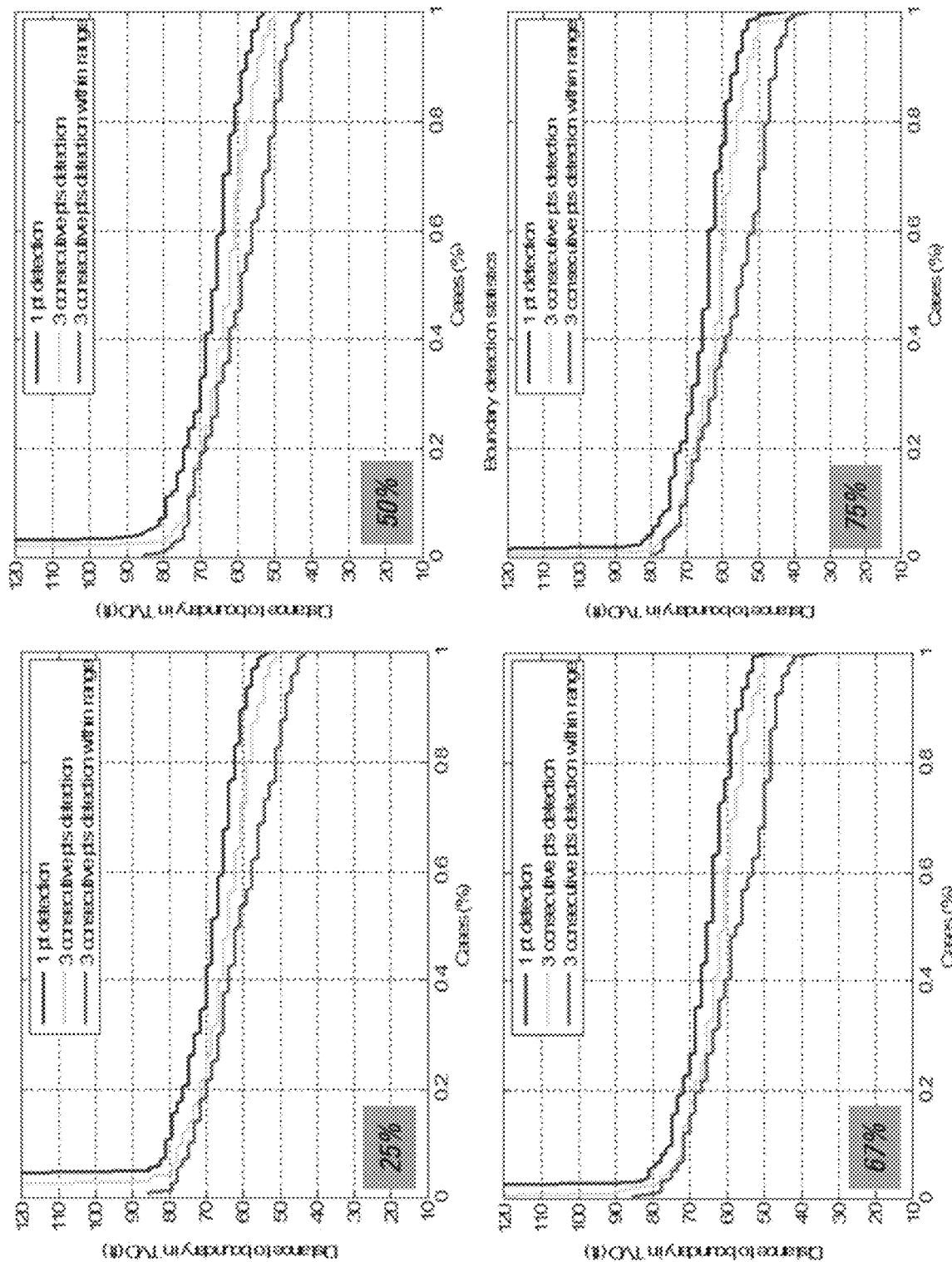
FIG. 14 depicts a comparison of cumulative results of distances to bed boundaries that are generated according to one or more embodiments disclosed herein.

FIG. 12 depicts a comparison of cumulative results that were obtained for 50, 100, and 200 simulated runs or realizations, according to the methods and systems disclosed herein. FIG. 13 depicts a comparison of cumulative results that were obtained for 200 simulated runs or realizations for three defined ranges of 3 feet, 6 feet, and 10 feet, according to the methods and systems disclosed herein. FIG. 14 depicts a comparison of cumulative results that were obtained for 200 simulated runs at thresholds defined for 25% level, 50% level, 67% level, and 75% level.

A few example embodiments have been described in detail above; however, those skilled in the art will readily appreciate that many modifications are possible in the example embodiments without materially departing from the scope of the present disclosure or the appended claims. Accordingly, such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination. In addition, other embodiments of the present disclosure may also be devised which lie within the scope of the disclosure and the appended claims. Additions, deletions and modifications to the embodiments that fall within the meaning and scopes of the claims are to be embraced by the claims.

Certain embodiments and features may have been described using a set of numerical upper limits and a set of numerical lower limits. It should be appreciated that ranges including the combination of any two values, e.g., the combination of any lower value with any upper value, the combination of any two lower values, or the combination of any two upper values are contemplated. Certain lower limits, upper limits and ranges may appear in one or more claims below. Numerical values are "about" or "approximately" the indicated value, and take into account experimental error, tolerances in manufacturing or operational processes, and other variations that would be expected by a person having ordinary skill in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include other possible embodiments along with the full scope of equivalents to which such claims are entitled. Accordingly, the claims are not limited by the disclosure.

The invention claimed is:

1. A method to determine a depth of investigation, comprising:
   generating an error distribution model for a logging tool;
   generating, for each of a plurality of measurement channels of the logging tool, a corresponding standard deviation distribution from the error distribution model with application of noise and systematic errors to the error distribution model, wherein the corresponding standard deviation distribution spans a range of formation resistivities;
   defining, for each of the plurality of measurement channels, a corresponding resistivity dependent detection threshold above which a corresponding measurement channel signal considered reliable based on the corresponding standard deviation distribution;
   generating, for each of the plurality of measurement channels, a corresponding simulated formation model to determine depth of investigation, the depth of investigation being biased by the corresponding resistivity dependent detection threshold; and generating, for the plurality of measurement channels, a multiple channel detection range map for detection of a shoulder using the depth of investigation for each of the plurality of measurement channels, the multiple channel detection range map providing a gauge of sensitivity corresponding to resistivity contrasts between a formation and the shoulder.

2. The method of claim 1, wherein the generating comprises generating detection range maps for each of the plurality of measurement channels.

3. The method of claim 2, wherein the generating comprises combining the detection range maps to generate the multiple channel detection range map as a single detection range map.

4. The method of claim 3, wherein the combining includes determining a maximum depth of investigation for each of the plurality of measurement channels.

5. A method to determine distances to a bed boundary of an earth formation, comprising:
acquiring input data for a logging tool;
constructing a forward model based on the input data;
applying a plurality of errors to the forward model;
generating inverted maps corresponding to horizontal resistivities of the earth formation by applying an inversion technique to the forward model to predict distances to the bed boundary, the applying a plurality of errors to the forward model generating corresponding inverted maps;
defining a threshold to compare the predicted distances to the bed boundary with a true formation model which provides true distances to the bed boundary, wherein the threshold is defined using a relative confidence level being tested, a top resistivity and a bottom resistivity, wherein the threshold, $R_{Threshold}$, is defined by equation $$\frac{1}{R_{Treshold}} = \frac{level}{R_{top}} - \frac{1-level}{R_{bottom}}$$

where the level is the relative confidence level being tested, $R_{top}$ is the top resistivity and $R_{bottom}$ is the bottom resistivity; and
displaying results that exceed the threshold, wherein the displaying the results that exceed the threshold includes displaying results that correspond to the distances to the bed boundary and a percentage of realizations.

6. The method of claim 5, wherein the results that exceed the threshold includes at least one of:
first data points where the horizontal resistivities of the inverted maps exceed the threshold;
three consecutive data points where the horizontal resistivities of the inverted maps exceed the threshold; and
three consecutive data points where the horizontal resistivities of the inverted maps exceed the threshold within a predefined range.

7. The method of claim 5, wherein the defining a threshold to compare the predicted distances to the bed boundary with a true formation model which provides a true distance to the bed boundary includes applying a color scale to images of the inverted maps.

8. The method of claim 5, wherein the applying a plurality of errors to the forward model includes randomly generating at least one of noise and systematic errors.

9. The method of claim 5, wherein a lower relative confidence level improves sensitivity of the results and wherein a higher relative confidence level makes the results less sensitive and more robust.

10. A system comprising:
one or more processors;
memory operatively coupled to the one or more processors; and
processor-executable instructions stored in the memory and executable by at least one of the processors to instruct the system to:
construct a forward model based on the logging tool data;
apply a plurality of errors to the forward model;
generate inverted maps corresponding to horizontal resistivities of the earth formation by applying an inversion technique to the forward model to predict distances to the bed boundary, the applying a plurality of errors to the forward model generating corresponding inverted maps;
define a threshold to compare the predicted distances to the bed boundary with a true formation model which provides true distances to the bed boundary, wherein the threshold is defined using a relative confidence level being tested, a top resistivity and a bottom resistivity, wherein the threshold, $R_{Threshold}$, is defined by equation $$\frac{1}{R_{Threshold}} = \frac{level}{R_{top}} - \frac{1-level}{R_{bottom}}$$

where the level is the relative confidence level being tested, $R_{top}$ is the top resistivity and $R_{bottom}$ is the bottom resistivity; and
display results that exceed the threshold, wherein the display the results that exceed the threshold includes display of results that correspond to the distances to the bed boundary and a percentage of realizations.

11. The system of claim 10, wherein the results that exceed the threshold comprises at least one of:
first data points where the horizontal resistivities of the inverted maps exceed the threshold;
three consecutive data points where the horizontal resistivities of the inverted maps exceed the threshold; and
three consecutive data points where the horizontal resistivities of the inverted maps exceed the threshold within a predefined range.

12. The system of claim 10, wherein define a threshold to compare the predicted distances to the bed boundary with a true formation model which provides a true distance to the bed boundary comprises applying a color scale to images of the inverted maps.

13. The system of claim 10, wherein a lower relative confidence level improves sensitivity of the results and wherein a higher relative confidence level makes the results less sensitive and more robust.

* * * * *